Patented Nov. 20, 1928.

1,692,622

UNITED STATES PATENT OFFICE.

JAMES WILLIAM BULMER, OF CULLINGWORTH, ENGLAND.

MANUFACTURE OF CELLULOSE ACETATE.

No Drawing. Application filed February 15, 1928, Serial No. 254,635, and in Great Britain January 2, 1928.

My invention relates to the acetylation of cellulose, and to the production of conditions prior to acetylation proper; and is designed to reduce the variation in absorptive power of cellulose to a minimum. It is well known that the technical requirements for cellulose acetate to be used in more recent commercial applications are very exacting, and my purpose is to secure a greater degree of uniformity in acetylation than has hitherto proved feasible.

The usual method of procedure in the preparation of cellulose acetate is to add the cellulose to an acetylating mixture containing acetic acid, acetic anhydride and a condensing agent.

It is well known that cellulose in its available form is fibrous in structure, but with much variation as to thickness of walls and size of cells. Some of the difficulties surrounding the preparation of cellulose acetate of uniform character have to do with this variation in the absorptive capacity of the primary material cellulose, and I diminish these difficulties in the following manner:—

I first mix the cellulose with acetic acid, and after allowing time for uniform absorption I cool the mass to a temperature at which the acetic acid assumes or can be caused to assume the crystalline or "frozen" state; I prefer to cool well below 0° C. It may be supposed that this change in the physical state of the acetic acid from the liquid to a solid or crystalline mass, occurring largely within the fibres of the cellulose, produces some mechanical disruption causig the cellulose to become more receptive to the action of the chemical constituents of the complete acetylating mixture.

When the acetylation of cellulose is carried out after this preliminary treatment a very uniform product is obtained.

As an example of the invention 100 lbs. of cellulose of the type usually acetylated are impregnated with 750–850 lbs. of acetic acid of 98 per cent strength in a suitable container having a device for lowering the temperature to that at which the acetic acid crystallizes. After crystallization has occurred throughout the mass the latter may receive, at the same temperature or after the temperature has been allowed to rise, the acetic anhydride and condensing agent required for acetylation.

Having thus described the nature of my said invention and the best means I know of carrying same into practical effect, I claim:—

A process of preparing cellulose for acetylation which consists in mixing the cellulose with acetic acid of such strength that the acid crystallizes when cooled and then cooling the mixture until crystallization of the acid has occurred throughout the mass.

In testimony whereof I have signed my name to this specification.

JAMES WILLIAM BULMER.